United States Patent
LaFosse

(10) Patent No.: US 10,165,892 B2
(45) Date of Patent: Jan. 1, 2019

(54) POWDER DOSING SYSTEM

(71) Applicant: Mark LaFosse, San Diego, CA (US)

(72) Inventor: Mark LaFosse, San Diego, CA (US)

( * ) Notice: Subject to any disclaimer, the term of this patent is extended or adjusted under 35 U.S.C. 154(b) by 0 days.

(21) Appl. No.: 15/857,405

(22) Filed: Dec. 28, 2017

(65) Prior Publication Data
US 2018/0132652 A1    May 17, 2018

Related U.S. Application Data

(63) Continuation-in-part of application No. 14/918,434, filed on Oct. 20, 2015.

(60) Provisional application No. 62/065,881, filed on Oct. 20, 2014.

(51) Int. Cl.
| | | |
|---|---|---|
| *A47J 31/40* | (2006.01) | |
| *G01F 11/24* | (2006.01) | |
| *B65D 83/06* | (2006.01) | |
| *B65D 83/00* | (2006.01) | |
| *G01F 11/00* | (2006.01) | |

(52) U.S. Cl.
CPC ............ *A47J 31/404* (2013.01); *B65D 83/06* (2013.01); *G01F 11/24* (2013.01); *B65D 83/0005* (2013.01); *G01F 11/003* (2013.01)

(58) Field of Classification Search
CPC ... A47J 31/404; B65D 83/06; B65D 83/0005; G01F 11/24; G01F 11/003
USPC ........................................................ 222/361
See application file for complete search history.

(56) References Cited

U.S. PATENT DOCUMENTS

| | | | | |
|---|---|---|---|---|
| 699,828 | A * | 5/1902 | Adolfsson | C10H 15/12 222/342 |
| 934,182 | A * | 9/1909 | Jopling | G01F 11/24 222/339 |
| 950,286 | A * | 2/1910 | Hauty | G01F 11/24 222/339 |
| 1,497,772 | A * | 6/1924 | Conklin | B01F 11/0088 222/233 |
| 1,617,922 | A * | 2/1927 | Morrison | B67D 3/00 222/233 |
| 1,673,827 | A * | 6/1928 | Hurtt | A47K 5/10 222/216 |
| 1,765,622 | A * | 6/1930 | Schoen | A47K 5/10 222/336 |
| 2,064,719 | A * | 12/1936 | Baldwin | A47K 5/10 222/339 |
| 2,532,698 | A * | 12/1950 | Corkins | G01F 11/24 141/104 |
| 2,655,291 | A * | 10/1953 | Roundtree | B65B 1/366 222/181.3 |
| 2,893,609 | A * | 7/1959 | Spiess, Jr. | B65B 3/32 222/219 |

(Continued)

*Primary Examiner* — Benjamin R Shaw
(74) *Attorney, Agent, or Firm* — Donn K. Harms

(57) ABSTRACT

A portable storage and dispensing device for powder to be mixed with liquid is provided. The device, when actuated, dispenses measured powder portions from a reservoir of soluble powder and communicates those measured portions to a drinking vessel or container. The device includes a cannister having an interior cavity for positioning a powder reservoir which is adapted for dispensing with only one hand while gripping a central portion of the cannister. A dispensing end of the cannister is adapted to deposit the powder in small-mouthed containers and concurrently avoid spillage.

10 Claims, 10 Drawing Sheets

(56) References Cited

U.S. PATENT DOCUMENTS

| | | | | |
|---|---|---|---|---|
| 3,129,853 A * | 4/1964 | Hoskins | ............. | A47G 19/34 |
| | | | | 222/339 |
| 3,257,042 A * | 6/1966 | Aro | ............. | A47G 19/34 |
| | | | | 222/362 |
| 3,304,691 A * | 2/1967 | Parker | ............. | G07F 11/44 |
| | | | | 222/360 |
| 6,286,564 B1 * | 9/2001 | Wallace | ............. | B65D 1/06 |
| | | | | 141/18 |
| 2005/0029307 A1 * | 2/2005 | Py | ............. | A61F 9/0008 |
| | | | | 222/386 |
| 2007/0062976 A1 * | 3/2007 | Blum | ............. | B65D 35/46 |
| | | | | 222/362 |
| 2009/0057257 A1 * | 3/2009 | Marcus | ............. | A61J 9/08 |
| | | | | 215/11.6 |
| 2013/0333798 A1 * | 12/2013 | Bosveld | ............. | B29C 67/0085 |
| | | | | 141/2 |

* cited by examiner

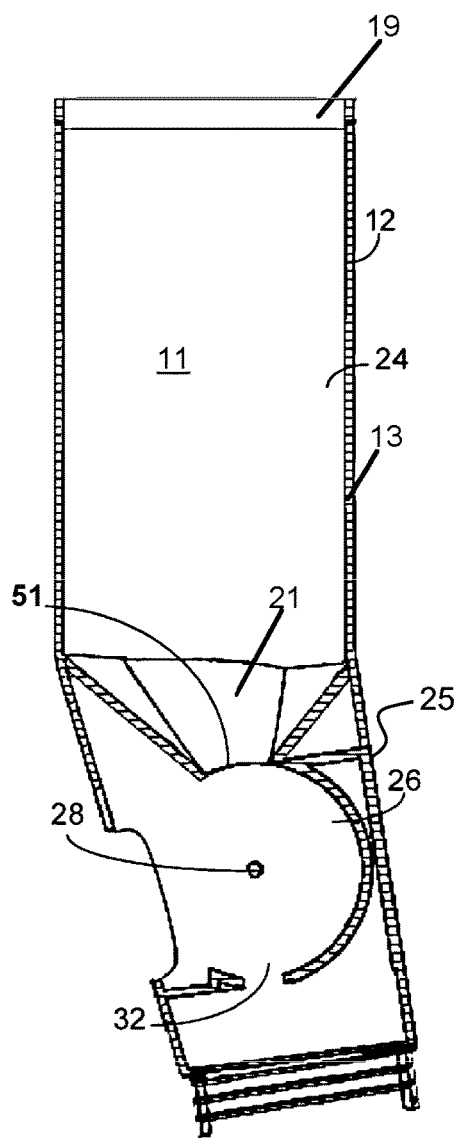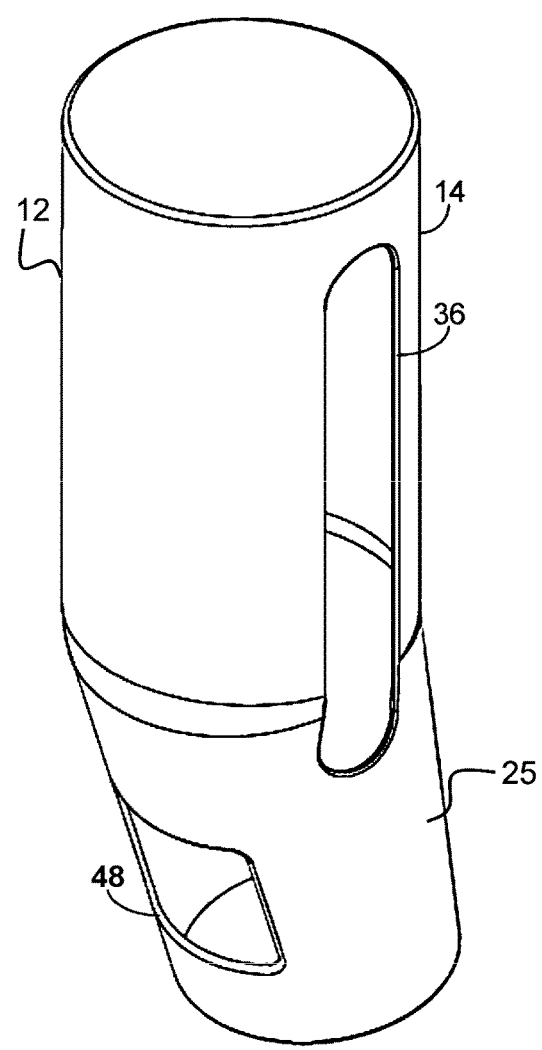
FIG. 3
FIG. 4

POWDER DOSING SYSTEM

This application is a Continuation in Part application to U.S. patent application Ser. No. 14/918,434 filed on Oct. 20, 2015, which claims priority to U.S. Provisional Application No. 62/065,881 filed on Oct. 20, 2014, both of which are incorporated herein in its entirety by this reference thereto.

FIELD OF THE INVENTION

The present device relates to portable storage and dispensing devices for mixing liquids with powdered concentrates, flavoring, or other soluble mixes which are measured for combination with a liquid. More particularly, the disclosed device, is configured for the storage, transport, and dosing of nutritional supplements and the like through the dispensing of measured volumes of powder into a beverage container, as well as providing an engageable user-accessible compartment which may be segmented to hold and sort additional pill and capsule supplements.

BACKGROUND OF THE INVENTION

Currently, many exercise and nutrition supplements are sold in a powdered form such that a user can easily mix a specific or measured volume of the powdered product into a beverage of their choice for consumption. The range of current powdered supplements is broad and includes, for example, powdered supplement protein formulas for muscle builders and athletes, to baby formulas for nursing mothers to virtually any fluid-soluble edible substance which may be mixed with a liquid such as water or milk or other liquid mixtures adapted for mixing with powdered additives.

Although consumption of such powdered supplements which require measured volumes of the powder to be combined with the liquid when used in the home can be easily accomplished with cups or jars, and available measuring devices, many users, especially those who prefer to consume a supplement at a specific time of the day, prefer sealable portable bottles for carrying such ingested liquid supplements. For example, many professional and amateur athletes consume protein formulas directly before their workout to maximize the efficiency and output of their effort, and may wish to ingest another such mixture afterwards.

Although many such powdered supplement and food products are packaged with measuring cups or spoons for proper measurement or dosing for the determined volume of liquid, the employment of such dispensing tools can be messy, prone to spills, and such are often imprecise. Such imprecision occurs due to powder-packing and spillage of excess powder beyond the edges of the measuring cup and can significantly vary the quantity and taste of the product dissolved in the liquid forming the drink.

Automatic measuring or dosing devices currently available in the art purport to solve the unmet need for a precise and clean dispensing system. However, such products are often designed for industrial use and are heavy and not particularly portable. Further, conventional measuring or dosing devices for mixing powders with liquids generally lack a means for dispensing carefully measured powder into the narrow openings of a bottle or drinking containers. Such results in powdered spillages and improperly mixed drinks.

As such there exists an unmet need for a lightweight and portable powder container for powder mixtures which must be measured accurately prior to being mixed with a liquid for ingestion by the user. Such a measuring or dosing device should be configured to accurately and easily dispense a volume of stored powder into a bottle or container. Such a device should be configured to communicate the accurately measured dose of powder into a narrow opening of a beverage container without loss or spillage and should do so hygienically. Because not all supplements ingested are provided in a soluble powder to be ingested as in liquid form, such a device should additionally include compartments for storing and carrying differing powdered products or supplements in pill or tablet form to allow the user to carry their nutritional products together. Finally, if the device functions as a reservoir for the powdered mix, such a device should be enabled with means to maintain the powder dry, to eliminate problems associated with moisture reaching a powder reservoir such as clumping, and mold growth for example.

The forgoing examples of related art and limitation related therewith are intended to be illustrative and not exclusive, and they do not imply any limitations on the invention described and claimed herein. Various limitations of the related art will become apparent to those skilled in the art upon a reading and understanding of the specification below and the accompanying drawings.

OBJECTS OF THE INVENTION

It is an object of the present invention to provide a device capable of hygienic and secure storage of soluble nutritional supplements, drink flavoring, and other food adapted for ingestion while in a liquid, in a powder form.

It is an additional object of this invention to provide such a device which is further configured to measure and dispense an accurate or specific volume or dose of powder into a liquid container during use.

It is another object of this invention for the device to provide removably engageable storage for other ingested supplements in a separate storage compartment from the soluble powder.

These and other objects, features, and advantages of the present invention, as well as the advantages thereof over existing prior art, which will become apparent from the description to follow, are accomplished by the novel construction and improvements for a supplement carrying device described in this specification and hereinafter described in the following detailed description which fully discloses the invention, but which should not be considered as placing limitations thereon.

SUMMARY OF THE INVENTION

In accordance with the purposes of the present invention, as embodied and broadly described herein, the present invention provides a soluble powder dispensing device configured in one preferred mode as a combination soluble powder and pill storage container and dispenser. In all modes of the device herein, it is preferred that the device provide an easy-actuated measuring and dispensing component to measure a volume of soluble powder and thereafter communicated the measured volume to a drinking vessel. In all modes herein, the powder volume measurement and dispensing actions can be accomplished using a hand activated actuator, which includes a trigger operatively connected to an internal measuring component for imparting motion thereto to first measure and then dispense the measured powder to a drinking vessel.

In one preferred mode, the device is configured such that powder is housed in a reservoir at a first end of the housing or cannister of the device. In another preferred mode of the device, the soluble power is provided from a supply of canisters where each canister is adapted for engagement with a first end of the housing of the device, to communicate a supply of soluble powdered material for measuring and dispensing. The housing or cannister of the device, which has a sidewall which defines an interior cavity or reservoir for powder storage, may also be surrounded by a silicone sleeve for increased user grip, durability, damage prevention, hygiene and aesthetics.

In manually activated modes of the device, an actuator to cause the dispensing chamber to measure and dispense the measured volume of powder, is provided by a depressable trigger or lever which is operatively engaged to or within the cannister, to project from a side surface of the sidewall of the device. Depression of the member or button by a user causes a dispensing chamber within the device to rotate about a central axis, or within a circular race, positioned within a central area of the canister. This rotation expels a measured volume or dose of soluble powder or other material, from a measuring chamber and to a dispensing tip adapted to communicate the dispensed powder to either a wide or narrow drinking vessel.

An optional storage compartment is adapted for engagement at the first or reservoir end of the cannister of the device. The storage compartment is configured to hold pills or other supplements or medications therein. So engaged, the storage compartment serves the dual functions of storing additional medications or supplements, and acting as a lid for the canister to maintain a powder supply within the reservoir of the device. Optionally a food-grade desiccant can be held within an aerated portion on an exterior wall of the storage compartment, to help maintain the powder stored in the device dry.

On the opposite end of the cannister of the device, a cap may be provided. The cap is adapted for positioning over a dispensing tip adapted for dispensing into narrow drinking vessels to protect it and keep it clean during transportation and storage.

The canister has a sidewall defining an overall cylindrical shape of the cannister at a first end. The sidewall defines an interior cavity which acts as a reservoir or powder container. One end of the formed powder reservoir, adjacent a mid portion of the cannister, narrows to direct and funnel powder held in the interior cavity, through an ingress slot and into the dosing chamber sized to preferably measure a volume of powder which may relate to a weight thereof. Preferably, the powder container, defined by the interior cavity, should be sized to hold between 5 and 20 cubic inches of soluble powder or other foodstuff to be mixed with an ingestible liquid.

The measuring chamber, preferably should be sized to intake a determined volume of powder from the reservoir or interior cavity and communicate that volume of power in a subsequent dispensing to the drinking vessel. The measuring or dosing chamber is situated in a rotating measuring component which is actuated from a first position to receive a volume of powder from the interior cavity, to a second position wherein gravity causes the measured volume of powder to exit an internal measuring chamber and flow to a narrowed second or proximal end of the cannister. This second or proximal end of the canister may include threads or other complimentary fastener engagement thereon to fasten to the dispensing tip if employed. Such a complimentary fastener engagement, for example threads, will allow for a plurality of different tips to be engaged. Such complimentary fasteners can include slots, threads, clasps, press fits, frictional engagement, and slotted fins.

The canister defined by the sidewall additionally includes an actuator aperture through which an actuator trigger or button or member will project away from the exterior of the sidewall. The actuator may have this trigger or button engaged to an actuating member operatively engaged to rotate the measuring component with internal measuring chamber, between the first position wherein powder enters the measuring chamber, to a second position wherein that entry is blocked, and a second end of the measuring chamber is put into communication with a dispensing end of the device.

Actuators, to rotate the measuring chamber, can include a trigger rotationally engaged to translate a member or can include the trigger being translatable to rotate the housing containing the measuring chamber, or other means to move the housing having the internal measuring chamber from a first position wherein a first end is open for communication of powder from the reservoir or internal cavity, to a second position wherein communication with the interior cavity is blocked, and the measuring chamber is in communication at a second end with a pathway to dispense the powder to a drinking vessel.

If an onboard reservoir of powder is maintained in the interior cavity, graduation marks molded, painted or adhered to the canister can additionally be employed to provide the user with a visually discernable measurement of the internally stored volume of powder.

Sealing features within the canister may be operatively positioned at the distal end of powder container and at the egress slot to prevent powder loss as the dispensing chamber rotates. Additionally preferred in all modes of the device to maintain hygiene and render the device easy to hold and manipulate, a silicone sleeve may be included. The sleeve contoured to fit tightly around the exterior of the sidewall forming the canister, and additionally will include a viewing portal and an actuator portal to allow for the trigger and to view the contents.

In one mode of the device, the actuator, to move the measuring chamber between the first and second positions, is a rotationally engaged trigger which, when depressed, translates an arm rotationally engaged to a cylindrical member in which the measuring chamber is positioned. In another mode, the actuator may be a button having a contacting face and at least one gear rack engaged with a gear connected to the cylindrical member. In all modes, the actuator trigger or button is returned to a projecting position extending from the sidewall of the device by a biasing member such as a spring operatively engaged with either the translating member or the rotating member to bias them back to a projecting position.

The dispensing component of the device is cylindrical in shape or a cylindrical member and configured to rotate the dosing chamber as the cylindrical member rotates about a shaft or within a wall defining a circular race. This rotation between a first position and second position is imparted by the user activating the actuator by depressing the trigger or face of the translating member.

As noted, in a first position, a chamber inlet allows powder to fall under the force of gravity through the ingress slot in a mid section of the canister from the reservoir or interior cavity, and then enters into the measuring chamber. Rotating the dispensing component or cylindrical member by employing the actuator, aligns an outlet slot with the egress slot wherein gravity will communicate the specific volume of powder, equal to the size of a measuring cavity of the dispensing component, to fall and exit at a second end of the canister.

The pill container, includes a pill cap and container base which interlock to both store additional pills and supplements and to seal the distal end of the canister. The pill container base should contain one or multiple o-rings, gaskets or alternative sealing fixtures to ensure an airtight fit against the inner cylindrical face and distal edge of the canister.

The pill container can additionally contain internal and removable cavities or separators to organize several different types of pills. Optional desiccants and labels within the pill container could ensure that its contents remain dry and identifiable.

The dispensing tip is preferably curved and frusto conical in shape. This allows the user to communicate powder from the second end of the canister, into the drinking vessel of choice. The dispensing tip may be removably engageable using complimentary fasteners between the second end of the cannister and the dispensing tip such as threads on both to tightly and securely mate to the matching threads of the canister.

A current preferred diameter of the dispensing tip aperture is between 0.25 and 3 inches which has been found in experimentation to control an orderly flow of powder into the drinking vessel over a few seconds, rather than have it all drop in at once which can cause problems with splashing, overflow and mixing. Additionally, it has been found that forming the dispensing tip in a curve away from a center axis of the cannister, has been shown to help increase powder flow in this orderly fashion, prevent blockages, and preventing overly large volumes of the measured powder from communicating into the drinking vessel instantly. Finally, a funnel is designed with a distal end which fits within the proximal end of the canister for easy powder loading.

To employ the device herein, the user loads powder from an original package or container into the reservoir or interior cavity at the first end of the cannister of the device. If employed, the secondary or pill container may then be placed securely on the filled canister, or just a cap may be placed thereon.

The user primes the device by holding it upright with the measuring chamber biased to the first position, by a biasing member such as a spring, and with the chamber inlet slot of the measuring chamber positioned to communicate powder from the reservoir or interior cavity under the force of gravity, through the ingress slot of the canister and into a defined measuring cavity of the cylindrical member housing the measuring cavity.

Pressing a trigger or button to activate the actuator will cause the dispensing component or cylindrical member to rotate to a second position, wherein an outlet slot of the measuring cavity aligns with the egress slot of the canister. Gravity carries the powder from the measuring cavity, and only the specific volume of powder, equal to the size of the measuring cavity, will fall into a properly positioned drinking vessel or container of choice.

In another preferred mode of the device, the housing or canister defined by the sidewall, may be shorter between the mid portion and first end, and thus does not have an internal cavity or reservoir to store powder. In this mode of the device, the first end of the cannister is adapted for engagement to one or a plurality of containers for commercially available products adapted for mixing with a liquid of choice. As such, in this mode of the device, the reservoir at the first or reservoir end of the cannister, is provided by the commercial container which is adapted for a removable engagement with the first end. This removable engagement may for example be a frictional engagement between one end of the commercial container and the first or reservoir end of the device herein, or a threaded engagement therebetween, or other removable engagement as would occur to those skilled in the art.

Additional device components in either preferred modes can be implemented as part of the dispensing mechanism for ease of use and to ensure product cleanliness and longevity including items in a list including but not limited to: o-rings, gaskets, bearings, brushes, linear slides, rods, or bushings. Some or all of the components of the device herein can be formed from one or a combination of food-safe durable materials from a group including plastic, rubber, silicone, glass, metals, ceramics, and polymeric materials.

With respect to the above description, before explaining at least one preferred embodiment of the herein disclosed invention in detail, it is to be understood that the invention is not limited in its application to the details of construction and to the arrangement of the components in the following description or illustrated in the drawings. The device herein described and disclosed in the various modes and combinations is also capable of other embodiments and of being practiced and carried out in various ways which will be obvious to those skilled in the art. Any such alternative configuration as would occur to those skilled in the art is considered within the scope of this patent. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other powder and pill storage and dispensing products for carrying out the several purposes of the present disclosed device. It is important, therefore, that the claims be regarded as including such equivalent construction and methodology insofar as they do not depart from the spirit and scope of the present invention.

BRIEF DESCRIPTION OF DRAWING FIGURES

The accompanying drawings, which are incorporated herein and form a part of the specification, illustrate some, but not the only or exclusive examples of embodiments and/or features of the disclosed device. It is intended that the embodiments and figures disclosed herein are to be considered illustrative of the invention herein, rather than limiting in any fashion.

In the drawings:

FIG. 1 depicts a left side view of a first preferred mode of the device in an assembled configuration having a translatable member engaged with a gear providing the actuator to rotate the cylindrical member having the measuring cavity therein in a first position.

FIG. 2 displays a cross sectioned right view of the first preferred mode of the device shown in FIG. 1 and depicting the translating member and gear defining the actuator to rotate the cylindrical member between first and second positions.

FIG. 3 depicts a section view of the device showing the internal cavity defined by the interior surface of the sidewall, and axis and cavity sized for rotational engagement of the cylindrical member.

FIG. 4 depicts an isometric view of a silicone sleeve component sized for engagement upon the exterior surface of the device herein.

Figure 5:
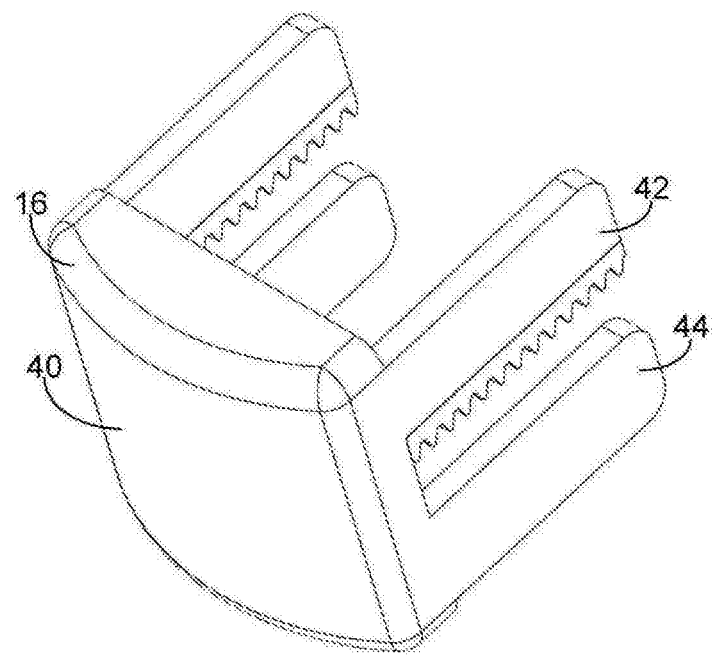
Figure 6:
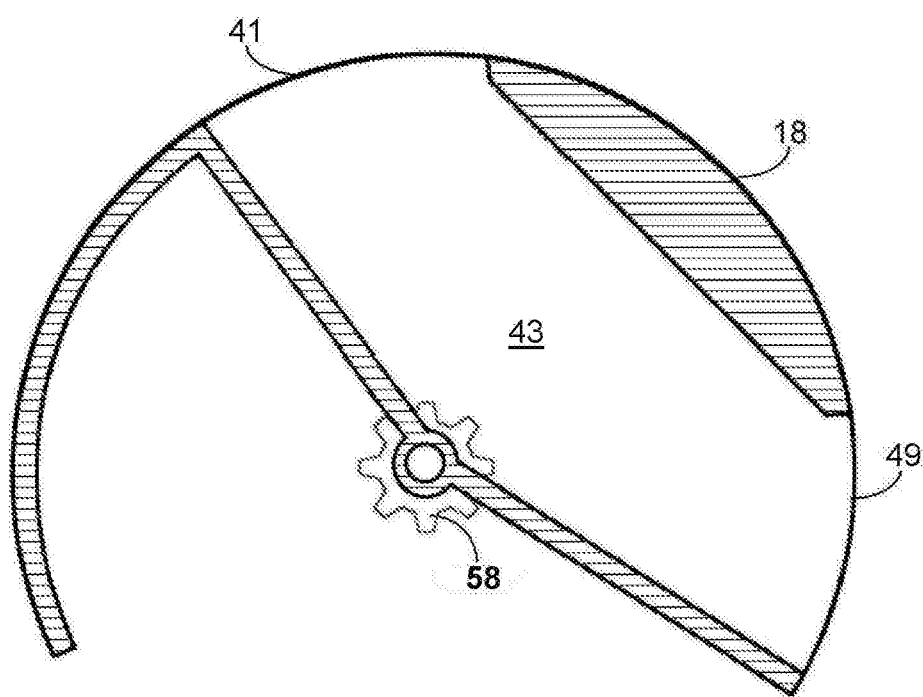

FIG. 5 displays a view of an actuator formed as a translatable member having a gear rack engageable with a gear operatively attached to the circular member such as in FIG. 6.

FIG. 6 depicts a cross sectioned right view of the dispensing chamber for the powder stored in the sleeve-surrounded cannister.

Figure 7:
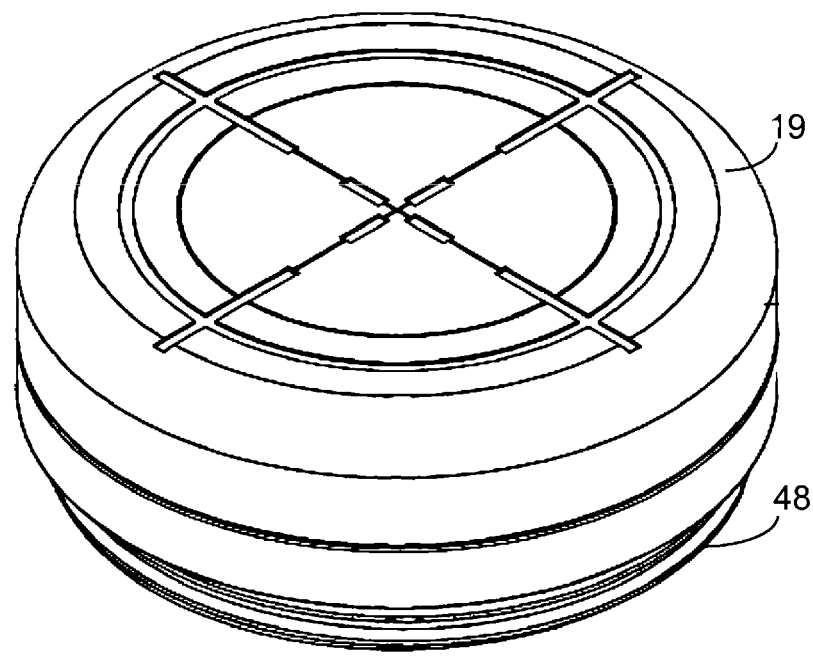

FIG. 7 shows a perspective view of an engageable lid employable to cover the open end of the interior cavity.

Figure 8:
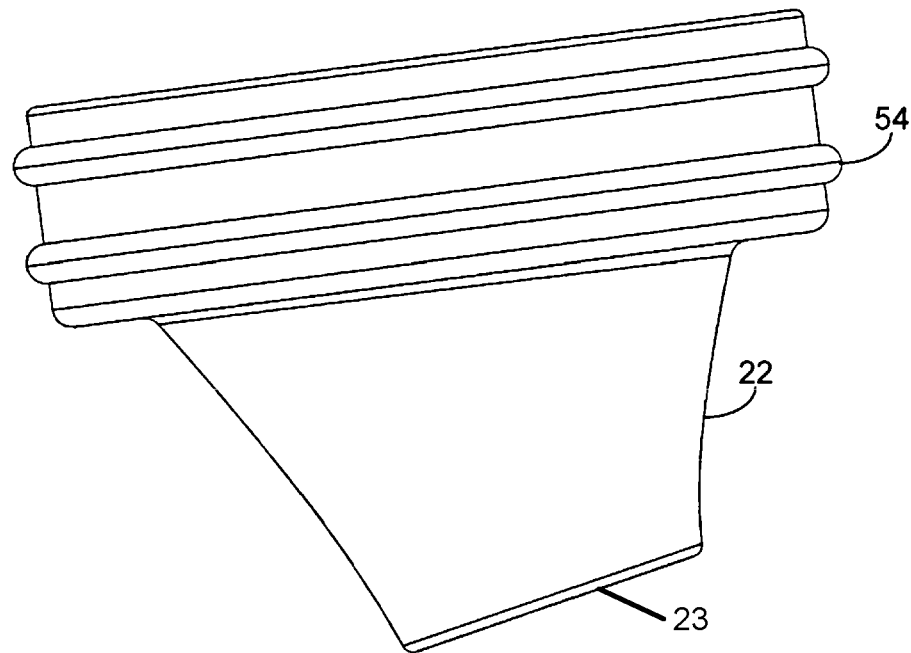

FIG. 8 displays a side view of a removably engageable spill-preventing frustoconical dispensing tip adapted for dispensing powder within the circumferential edge of a glass or container.

Figure 9:
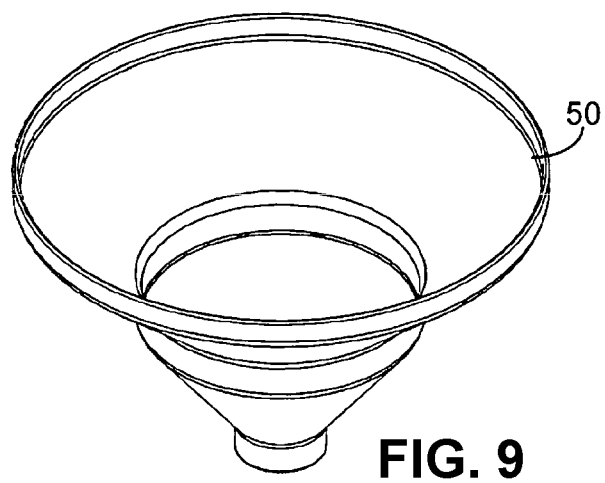

FIG. 9 depicts a perspective view of a loading funnel employable for filling the reservoir or internal cavity defined by the sidewall of the cannister.

Figure 10:
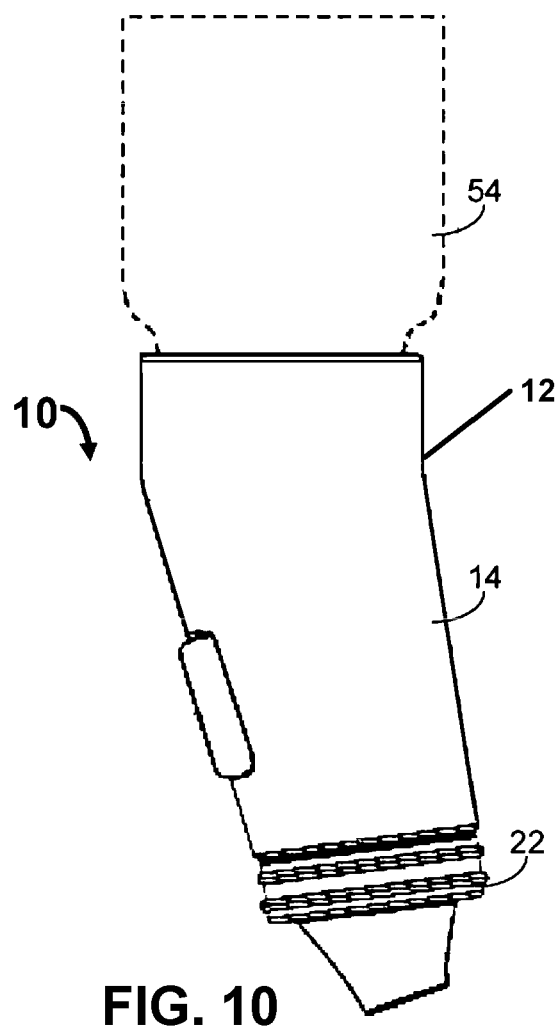

FIG. 10 represents a side view of the device having the distal or reservoir end of the cannister adapted for sealed removable engagement with a third party container.

Figure 11:
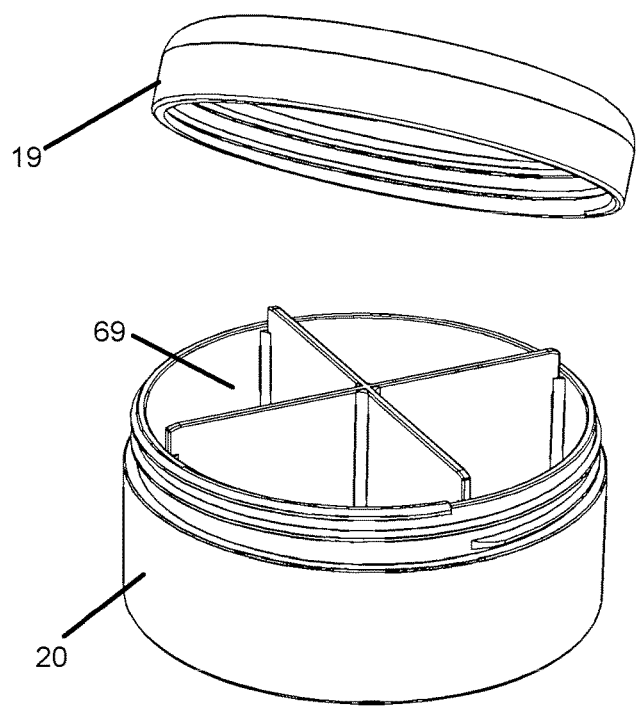

FIG. 11 shows the optional secondary container formed as a segmented pill or tablet holder configured to be employed in place of the engageable lid of FIG. 7.

Figure 12:
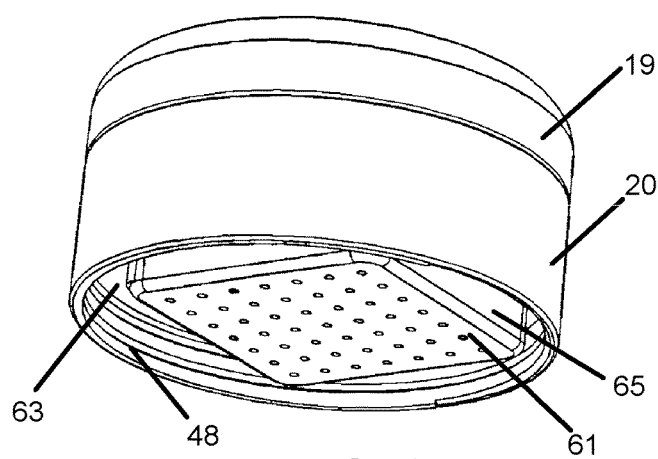

FIG. 12 depicts a perspective view of a perforated holding cavity adapted for positioning of a desiccant therein which may be engaged to either the lid of FIG. 7, or the secondary container of FIG. 11.

Figure 13:
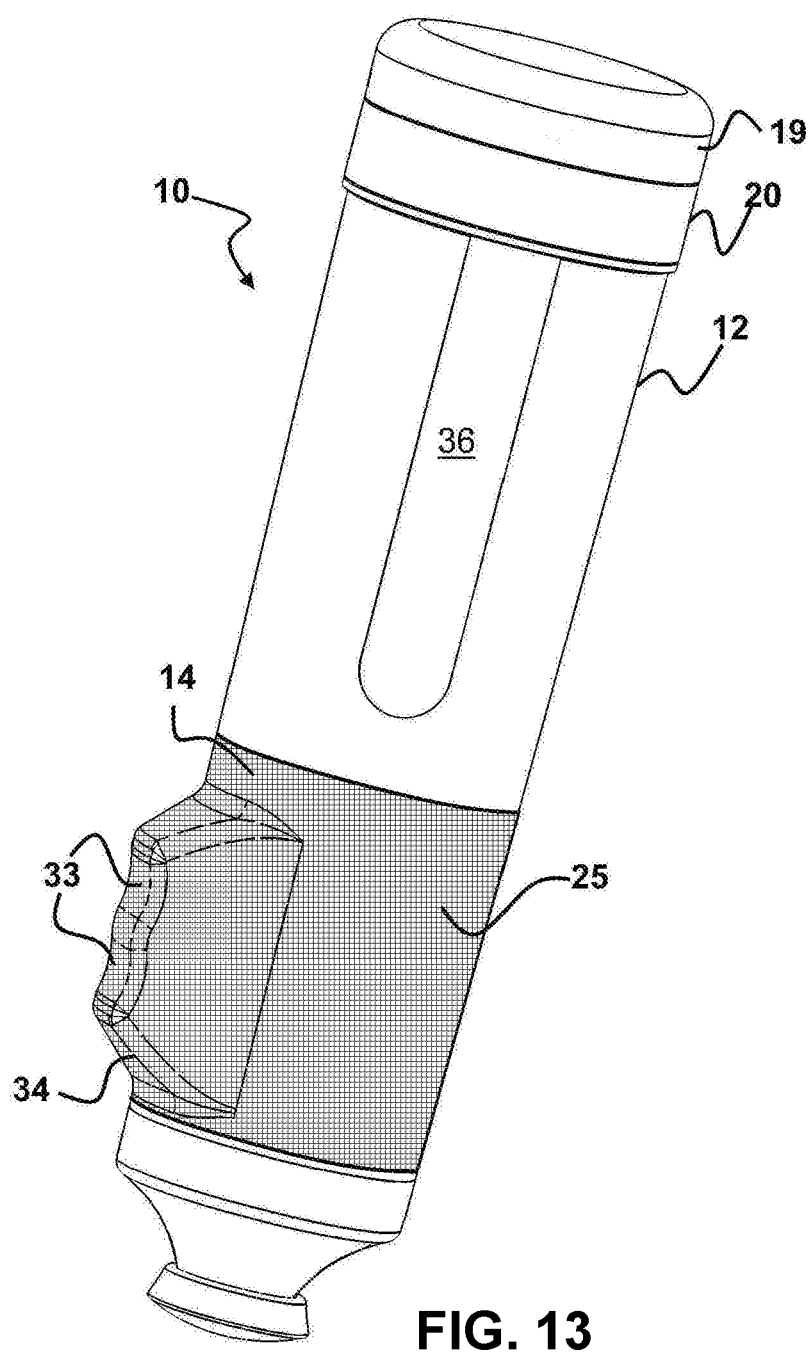

FIG. 13 shows another mode of the device which is configured as with the others herein whereby it is adapted for a one-handed grip and dispensing by gripping the cannister with one hand around the sleeve which covers the cannister at a lower end and depressing the button with the fingers or thumb, while gripping the sleeve.

Figures 14, 15, 16:
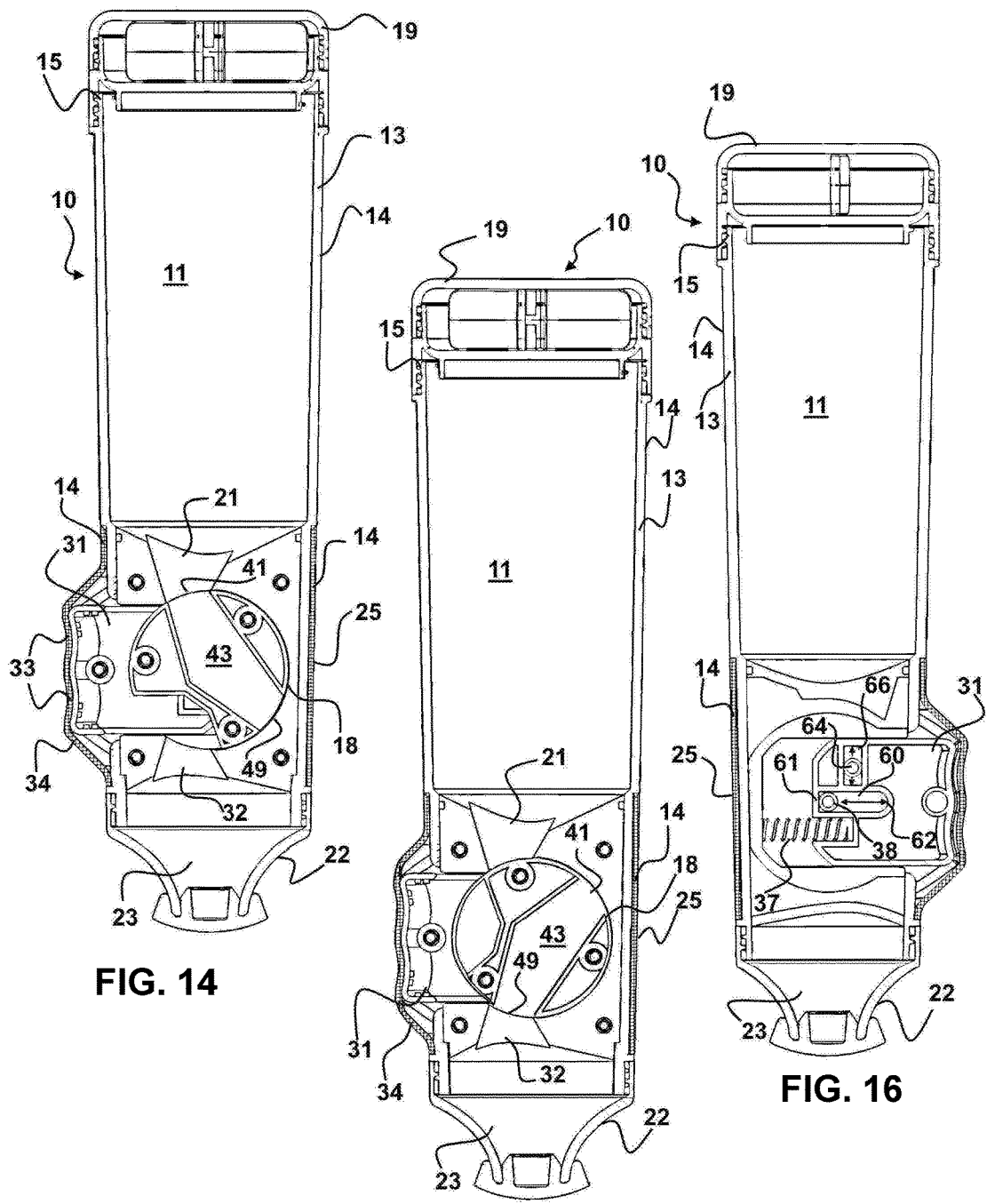

FIG. 14 shows the device of FIG. 13 in a sectional view showing the measuring chamber in a default position where it will fill with a measured amount of powder.

FIG. 15 depicts the device of FIGS. 13-14 in a dispensing configuration, where a user gripping the device in the gripping area defined by the flexible sleeve, has depressed the button positioned under the sleeve, in a one-handed action to dispense powder.

FIG. 16 depicts a sectional view of the device from the opposite side from FIG. 14, showing the trigger positioned and adapted for one-handed actuation by a user gripping the device with one hand around the sleeve in a defined gripping area.

Figure 17:
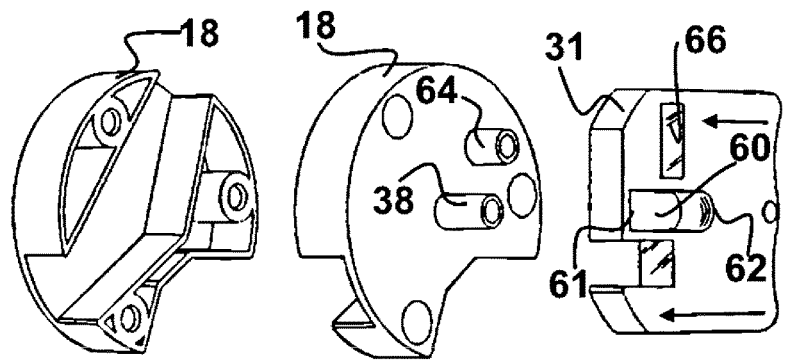
Figure 18:
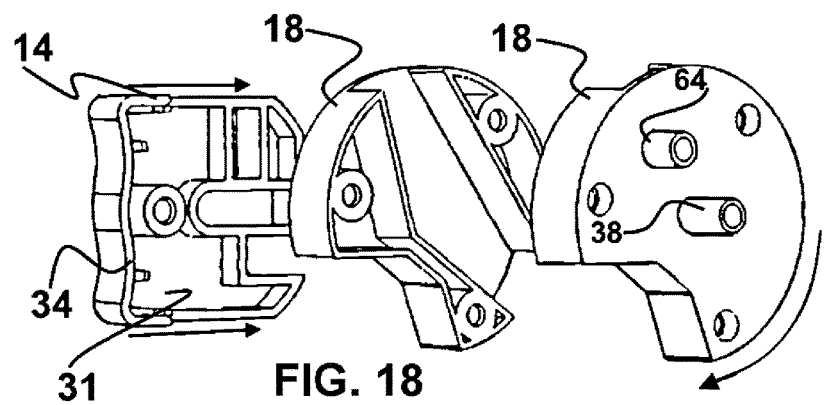
Figure 19:
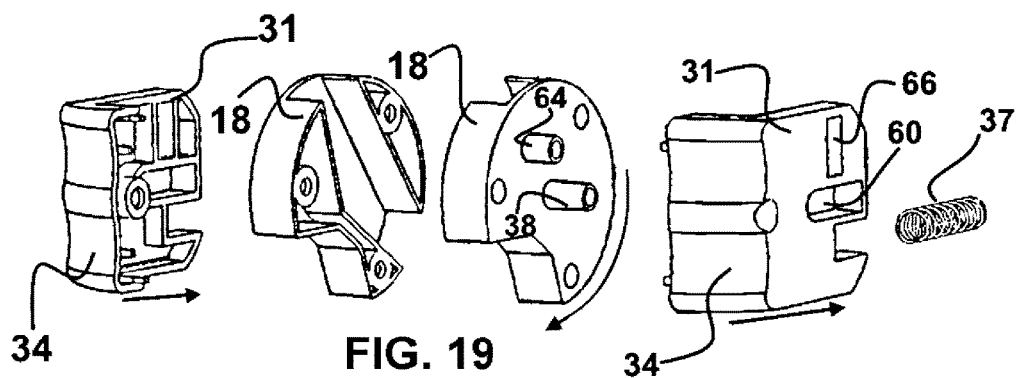

FIGS. 17-19 depicts exploded views of the trigger mechanism providing the one-handed activation for rotation of the measuring chamber from the static position of FIG. 14 to the dispensing position of FIG. 15.

DETAILED DESCRIPTION OF THE INVENTION

Figure 1:
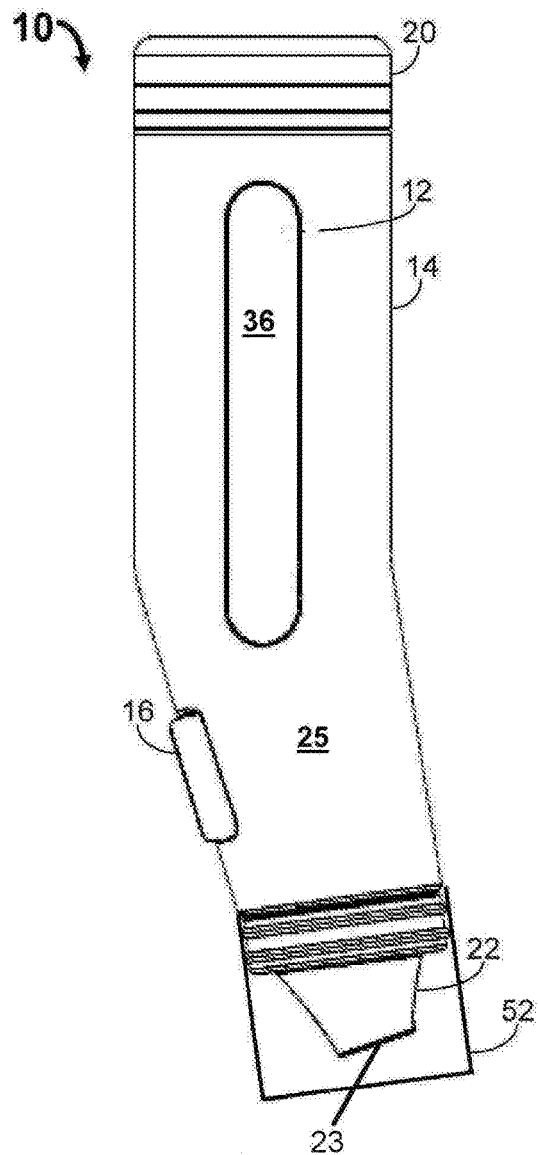

Now referring to drawings in FIGS. 1-19, wherein similar components are identified by like reference numerals, there is seen in FIG. 1 an exterior view of the device 10 configured in a preferred mode, assembled wherein powdered supplements may be stored within an internal cavity 11 at a first end of the canister 12.

As can be seen in FIG. 1 and also the sectional view of FIGS. 2-3 and FIGS. 14-16, the cannister 12 is primarily defined by a sidewall 13, and has external dimensions configured to allow positioning a sleeve 14 around all or at least a central portion 25 of the cannister 12 which defines a gripping area adapted for a one-handed grip of a user. The sleeve 14 is preferably formed of elastic material which allows for the stretching of the sleeve and an interior surface of the sleeve 14 defining an axial recess of a silicone sleeve 14. In this fashion the sleeve 14 is stretched and slid upon the exterior of the cannister 12 and forms a compressive contact with at least a central portion 25 of the cannister 12 in between the first end where the lid 19 engages and a second end of the cannister 12 where the dispensing tip 22 is engaged.

This gripping area which is defined by this central portion 25 of the cannister 12, adjacent the second end, in all modes of the device 10, is configured for compressive frictional engagement of the elastic sleeve 14 surrounding the sidewall 13 in the central portion 25 on a first side of the cannister 12 by the palm of a user. This first side is positioned opposite a second side of the gripping area of the central portion 25 of the cannister 12 from which the trigger 31 projects. Thus the cannister is configured and adapted for one-handed use to measure and dispense powder when the palm of the user is compressibly in contact against the elastic sleeve 14 on the first side of the cannister 12, opposite the second side of the cannister 12 from which the trigger 31 projects, and with fingers of the user in such a one-handed grip moveable to depress the trigger 31 and actuate the dispensing housing 18 to a second position wherein it dispenses powder from the measuring chamber 43.

This configuration, with the elastic sleeve 14 and sidewall 13 on the first side of the cannister 12 is adapted for a compressive frictional engagement with the palm of the hand of the user, allowing the fingers of the hand of the user to curve around the exterior of the elastic sleeve 12 to operative contact over the elastic sleeve 14 covering the trigger 31, was found to be the most ergonomic and comfortable for a user during one-handed activation to depress the trigger 31 with the curved fingers of the user, and thereby to rotate the measuring chamber 43 and cause an ejection of a measured portion of powder from the measuring chamber 43.

The elastic sleeve 14 located at least in the central portion 25 of the cannister 12, not only provided a much better grip for a user since it compressed slightly during activation, it also padded both the palm and fingers of the user during compression of the trigger 31 and gave the user a better grip upon the trigger 31 underlying the sleeve 14. As such, a sleeve 14 formed of an elastic material, such as a polymeric material or, for example, silicone, is especially preferred, at least surrounding the central portion 25 of the cannister 12 which thereby defines a padded and frictionally enhanced gripping area for the user.

Unexpectedly, instead of covering all or almost all of the cannister 12 with an elastic sleeve, forming the elastic sleeve 14 in a manner to only cover the central portion 25 of the cannister 12 was found to work better with users. This is because the formation of the sleeve 14 to cover the central portion 25 of the cannister 12 defined a visibly discernable gripping area in the central portion 25 which new and prior users more easily discerned as the area for one handed grip and operation of the device 10 to disburse measured volumes of powder.

Also shown in FIGS. 1-2 and 14-16, the canister 12 has a sidewall 13 defining an internal cavity 11 employable as a reservoir for supplement or other powder. The exterior of the device 10, as noted above, in particularly preferred modes, includes a polymeric sleeve 14 formed of elastic material which will compress and elongate, such as, for example, a silicone sleeve 14, sized to surround and protect the sidewall 13 or at least the central portion 25 of the device 10 during use and transport. The sleeve 14 is sufficiently elastic to be stretched and slid upon the exterior of the device 10, and once engaged it provides a compressible and non-slip surface for enhancement of user grip on the assembled device 10 as well as enhancements to durability to protect the device 10 from drops and bumps, and other potentially injurious contact.

Figure 2:
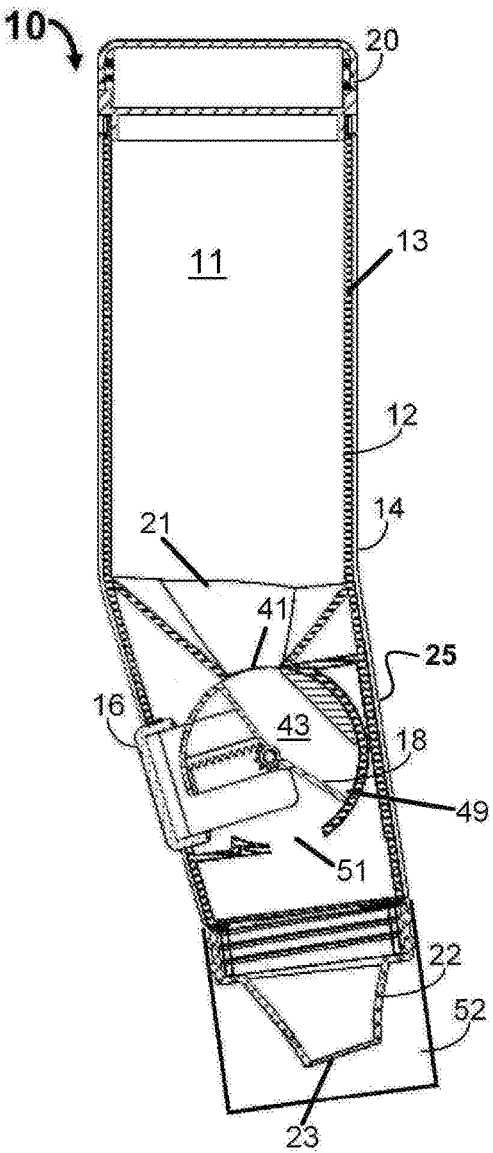
FIG. 2a depicts a mode of the device similar to that of FIGS. 1-2 but wherein an actuator is a rotationally engaged trigger operatively connected to rotate the cylindrical member, and biased to a projecting position from the sidewall of the device.
FIG. 2b shows an enlargement of the actuator of FIG. 2A showing the trigger and engaged connecting member rotationally engaged between the trigger and the cylindrical member during actuation by a user and rotating the cylindrical member and measuring cavity from the first position toward the second position.

An actuator is operatively engaged for user-activation to initiate the device 10 to dispense powder stored in the interior cavity 11, into a drinking vessel or other container. As shown in FIG. 2, this actuation can be initiated by the user through the depression of a spring biased button 16, which is biased to a default position projecting away from the sidewall 13, through an aperture 17, therein and through the sleeve 14 if employed as in FIGS. 2-3, or underneath a covering sleeve 14 as in FIGS. 13-16.

In this depicted mode of an actuator, depression of the button 16 toward the sidewall 13 translates geared members (FIG. 5) to rotate a dispensing housing 18 about a central axis within a central area of the canister 12 to move from a first position to a second or a dispensing position wherein a measured powder dose from the interior cavity 11 of the canister 12 is communicated to and through an aperture 23 at the narrowing end of a frustoconical dispensing tip 22 and into the drinking vessel or other container.

It should be noted that the diameter of the aperture 23 at the dispensing tip 22 is preferably smaller than a circumference of the open end of a drinking glass or fluid container to be used with the device 10. The frustoconical shape of the dispensing tip 22 narrowing toward and at the aperture 23 is particularly preferred as it has been shown to avoid spillage occurring where the aperture 23 is sized equal to the first end of the tip 22. Further, the frustoconical shape, and narrowing at the aperture 23, allows the user the ability to choose a glass or container of equal or preferably larger size than the aperture 23 by using the aperture 23 diameter as a measuring component.

A lid 19 may be provided for engagement at the opening to the interior cavity 11 at a first end of the cannister. The lid 19 would be configured for a removable engagement to the sidewall 13 defining the opening at this first end. Alternatively, as noted, a pill dispenser 20 can be configured to serve the dual functions of providing an interior cavity for storing additional medications or supplements therein, and providing an engageable lid for the opening to the interior cavity 11 at the first end of canister 12 which when removed allows for a filling or replenishment of the powder within the internal cavity 11 of the cannister 12.

Also shown in FIG. 1-2, a cap 52 may be provided in a configuration rendering it employable for a removable engagement with a second end of the cannister 12. So engaged the cap 52 will cover over the aperture 23 at the narrow end of the circumference of the dispensing tip 22 to protect it and keep it clean during transportation and storage.

Figures 2A, 2B:
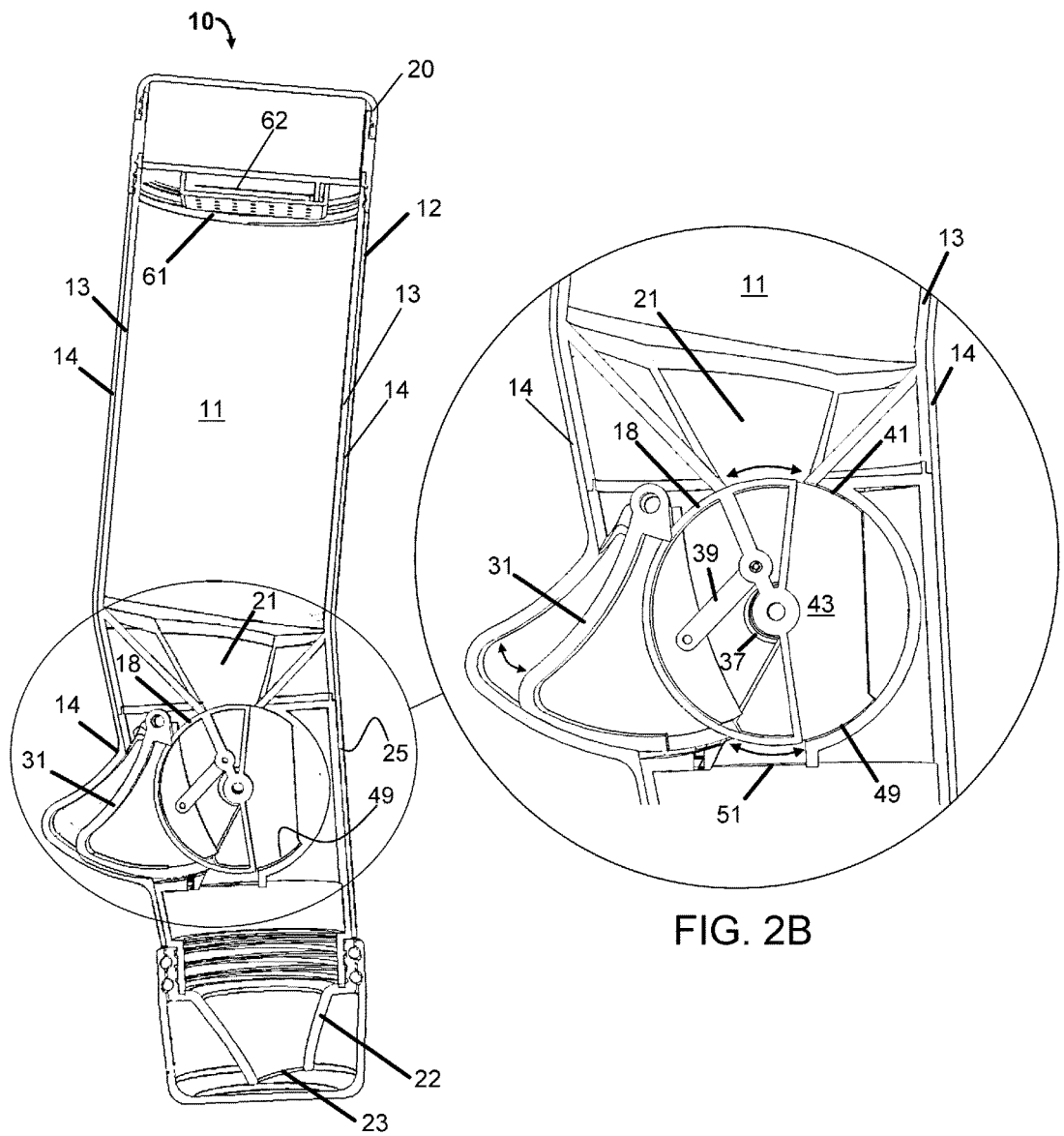

FIG. 2A depicts a mode of the device 10 similar to that of FIGS. 1-2 but wherein the actuator is provided by a rotationally engaged trigger 31 operatively connected to rotate the rotationally engaged dispensing housing 18. As with the actuator of FIG. 1, a biasing member such as a spring 37 is engaged with either the trigger 31 or the dispensing housing 18, or the connecting member 39, to impart a resistive bias against the trigger 31 to a default projecting position, extending away from the sidewall 13 of the device 10.

In this default position of the trigger 31 and actuator of FIGS. 2A-2B, or the button 16 and actuator of FIG. 1, the dispensing housing 18 is held in a first position, such as in FIG. 2, or FIG. 14, wherein a first opening or inlet aperture 41 of the measuring chamber 43 communicates with a passage leading to the interior cavity 11. In this first position, gravity will cause powder to communicate from the interior cavity 11 to fill a measured amount determined by the volume of the measuring chamber 43. In this position, an exit opening 49 at the opposite end of the measuring chamber 43 is sealed against a wall of a recess holding the measuring chamber 43.

Activation by compression of the trigger 31, with the user holding the cannister 12 with one hand gripping the central portion 25, overcomes the biasing force of the biasing member or spring 37, and rotates the measuring chamber 43, such that the exit opening 49 on the opposite end of the measuring chamber 43 aligns with an opening in the wall of the recess, wherein the powder under the force of gravity is placed in communication with an outlet aperture 23 of the container. Thus, the powder (not shown) will vacate the measuring chamber 43 and drop under force of gravity through the outlet aperture 23 of the cannister 12, and into a container thereunder. With the dispensing housing 18 and internal measuring chamber 43 in this second position, as can be surmised from the drawings by those skilled in the art, the first opening or inlet aperture 41, is sealed from communication with the interior cavity 11.

FIG. 2B depicts an enlargement of the actuator shown in FIG. 2A showing the trigger 31 and engaged connecting member 39 rotationally engaged between the trigger 31 and the cylindrical dispensing housing 18. As shown, the trigger 31 is spaced from the silicone sleeve 14 and moving away therefrom to actuate the dispensing housing 18 to rotate from the first position shown in FIG. 2, toward the second position wherein the exit opening 49 of the measuring chamber 43 will align with a gap 51 in the wall of the cavity hosting the measuring chamber 18 defining the egress slot 32. In the second position, powder within the measuring chamber 18 is communicable to and through the aperture 23 in the dispensing tip 22.

As depicted in FIG. 3, the canister 12 has a substantially tubular configuration formed by the sidewall 13 defining the internal cavity 11. In one preferred mode, an angled bend and subsequent narrowing of the diameter of a passage 21 communicating between the internal cavity 11, and the first opening 41 of the measuring cavity 43, serves to direct and funnel powder from the internal cavity 11, through the first opening 41 into the measuring chamber 43 which is sized to hold a measured volume of communicated powder. The internal cavity 11 preferably should be configured to hold between 5 and 20 cubic inches of powder in a preferred mode of the device 10 which has shown to allow for a number of sequential fillings of the measuring chamber 43.

The exterior circumference of the dispensing housing 18 should be sized to tightly fit and seal against the wall surrounding the dispensing housing 18 in all modes of the device 10, and thereby seal the first opening, or inlet aperture 41, from any powder communication from the internal cavity 11, when the dispensing housing 18 is rotated to the second position such for example as in FIG. 15, to communicate the measured volume of powder within the measuring chamber 43, through the exit opening 49 and to the dispensing tip 22. The dispensing tip 22 in the noted removable engagement to the second end of the cannister 12.

The canister 12 additionally contains an access hole for the button 16 and an axle 38 for rotation of the dispensing housing 18 thereon, if not fully supported by the wall surrounding the circumference of the dispensing housing 18. Graduated marks may be provided which may be molded, painted, or adhered to the canister 12 and can additionally be employed to display the volume of contained powder. Sealing features within the canister 12 should be placed at the distal end of the passage 21, and at the egress slot 32, to prevent powder loss as the dispensing housing 18 rotates and while being carried or transported if required.

As seen in the mode of the device of FIG. 4, the dimensions of the silicone sleeve 14 are contoured to a complimentary fit tightly around the exterior surface of the complimentary shaped canister 12. Where covering more than the central portion 25 of the cannister 12, the sleeve 14 additionally includes a viewing portal 36. Where the trigger 31 or button 16 protrudes through the sleeve 14, a button portal 48 is provided.

An example of an actuator formed as a button 16 is shown in FIG. 5, and includes an actuation face 40, two opposing gear racks 42, and a set of stabilizing legs 44. The button 16 or the canister 12 should contain a biasing member such as a spring 37 (FIG. 2B), to ensure that after actuation, the button 16, or trigger 31, is biased to return to its original projecting position. This biasing member, shown as a spring 37 for convenience, can be one or a combination of biasing members from a group including compression springs, tension springs, torsion springs, disk springs, or flexures.

The dispensing housing 18, as seen in FIG. 6, is cylindrical in shape and designed to rotate within a surrounding wall formed within a mid section of the canister 12 and about a shaft 28 if included. In the mode of the device of FIGS. 1-11, a rack or gear 58 on each side of dispensing housing 18 mates with the complimentary gear racks 42 extending from the button 16 if employed for the actuator.

During use, a first opening 41 allows powder to fall under the force of gravity into the measuring chamber 43 within the dispensing housing 18. Rotating the dispensing housing 18 clockwise until its chamber exit opening 49 or exit aperture aligns with the egress slot 32 of the canister 12 allows only the specific volume of powder, equal to the size of the measuring chamber 43 of the dispensing housing 18, to fall and exit the canister 12.

FIG. 7 shows a lid 19 removably engageable with the first end of the cannister 12 if the pill dispenser 20 is not employed and engaged. The pill dispenser 20 shown in FIG. 11 can be used and is preferably segmented and contains internal and removable cavities divided by removable separators to organize several different types of pills.

Shown in FIG. 8, the frustoconical dispensing tip 22, is curved and directs powder from the proximal end of the canister into the bottle or container of choice. One end of the dispensing tip 22 includes threads to tightly and securely mate to the complimentary matching threads of the canister 12. Additionally, the o-ring 54 seals of the dispensing tip 22 frictionally engage with the interior of the cap 52 and removably affixes the cap 52 to the dispensing tip 22 of the device 10. The diameter of the aperture 23 of the dispensing tip 22 should be between 0.25 and 3 inches. Additionally, the dispensing tip 22 should be curved or elongated in such a way as shown if FIG. 10 and FIGS. 1-2, with one side longer than the opposite side of the dispensing tip 22, as such has been found in experimentation to increase powder flow and prevent blockages.

Shown in FIG. 9 is a funnel 50 designed with the larger diameter end sized to fit within the first end opening communicating with the internal cavity 11 of the cannister 12, for easy powder loading. To employ the device 10 herein, the user loads powder from its original container, with or without the aid of the funnel 50, into the canister 12. The lid 19 or the pill dispenser 20 if included, is then placed securely on the filled canister 12 and the cap 52 is removed. Since the first opening 41 allows powder to fall therethrough under the force of gravity, the measuring chamber 43 of the dispensing housing 18 is filled by default.

Pressing the button 16 of FIGS. 1-2 or the trigger 31 of FIGS. 2A and 2B, causes the dispensing housing 18 to rotate clockwise until its chamber exit opening 49 aligns with the egress slot 32 to allow only the specific volume of powder, equal to the size of the inner cavity, to communicate from the dispensing cavity 18 and into the user's bottle or container of choice.

In another particularly preferred mode of the device 10, shown in FIG. 10, the first end of the canister 12 which has a lid 19 engaged thereon, has an internal cavity 11 not sized to both contain and store powder. However, the first end opening 15 which is covered by a removable lid 19 and is communicating with the internal cavity 11, is adapted to removably engage with one or a plurality of commercial product containers 54 used by different manufactures to ship and display their product, such as by threaded engagement. As such, in this mode, where canister container volume is unimportant, the internal cavity 11 can be minimized for increased transportability.

As noted above, FIG. 11 shows a larger and exploded view of the optional secondary container formed as a segmented pill or tablet holder configured with segmented cavities 69 to be employed in place of the engageable lid of FIG. 7.

Shown in FIG. 12 is a perspective view of a perforated holding cavity 61. This holding cavity 61, is removably engageable to the surface 63 of a front wall which communicates with the internal cavity 11 of either the lid of FIG. 7, or the secondary container shown in FIG. 11, and FIG. 2. The perforated holding cavity 61 is adapted for positioning of a desiccant therein which, once so positioned, will help maintain the powder within the internal cavity 11 dry. One means of removably engagement of the holding cavity 61 to the surface 63 of the front wall can be frictional engagement of the sidewalls 65 to projections extending from the surface 63 of the front wall.

In FIG. 15 is depicted another especially preferred mode of the device which is configured, as with the others herein, for a one-handed grip and dispensing of powder by a user gripping the cannister 12 with one hand around the gripping area 25 which as shown is surrounded by the elastic sleeve 14 formed of an elastic and compressive material, such as a polymeric material or, for example, silicone. This sleeve 14 is compressibly engaged with and covers the gripping area 25 of the cannister 12 which is adjacent the second end thereof. Depressing the trigger 31 located underneath a button portion of the sleeve 14 (FIGS. 14-16) located on a second side of the cannister 12 while it is being held with one hand having the palm thereof compressed against the opposite first side allows the user to activate the device 10 do dispense a measured amount of powder from the outlet aperture 23 at the second end of the cannister 12.

Also shown in FIG. 13 and in FIGS. 14-16 are depressions 33 descending into a facing surface of the trigger 31, and matching depressions 33 formed into mating positions on a button covering 34 portion of the sleeve 14 which projects from the area of the sidewall 13 of the cannister 12 to cover the trigger 31 and seal the interior of the device 10. The depressions 33 in both the trigger 31 and matching in the covering portion 34 of the sleeve 14 are especially preferred as they were found to enhance the grip of the fingers of the user on the trigger 31 during one-handed activation of the device 10 to dispense a measured volume of powder.

FIGS. 14-16 show sectional views of the device 10 of FIG. 13 herein. In FIG. 14 is shown a sectional view depicting the dispensing housing 18 rotated to the default position with the measuring chamber 42 aligned to accept powder from the internal cavity 11. The dispensing housing 18 is biased to the default position by the biasing member shown as a spring in FIG. 16. In this position a volume of powder from the internal cavity 11 will fill the volume of the measuring chamber 43. The dispensing housing 18 in the mode of the device 10 in FIGS. 14-16 operates in a similar fashion to that of FIGS. 1-13 to measure a volume of powder and provide for a one-handed use and activation to dispense the measured volume of powder which is substantially equal to the volume of the measuring chamber 42.

However, in the preferred mode shown in FIGS. 13-16, the sleeve 14 is formed as noted with covering portion 34 for a button or trigger 31, and is located only in the gripping area 25 of the device 10 which was found in experimentation to allow easier identification by a user for a position where to grip, and to allow for easier positioning of the sleeve 14. Further, the button or trigger covering portion 34 of the sleeve 14 provided enhanced sealing of the internal portions of the cannister 12 within the sidewall 13 from moisture and pathogens which can be communicated by the skin of the user and by just the air passing past the uncovered button 16 and 31 trigger of other modes of the device 10 herein.

Further, as shown most clearly in FIG. 16, and FIGS. 17-19, the trigger 31 is actuated differently than that of FIGS. 1-2A in that there is no gearing employed. Instead, the trigger 31 translates upon the axle 38 a translation distance determined by a distance of a length of an axle slot 60. During a one-handed use and compression of the trigger 31, the trigger 31 translates the distance of the axle slot 60 upon the axle 38, between a first end 61 thereof, to a second end 62 thereof, which will contact the axle 38 and cease further translation of the trigger 31. At all times, the biasing member or spring 37 biases the trigger 31 to return to a default position, with the axle 38 in contact with the first end 61 of the slot 60 which biases the dispensing housing 18 to the default position shown in FIG. 14.

During this translation of the trigger 31, a secondary member 64 extending from a connection to the dispensing housing 18, and which is engaged within a secondary slot 66 formed in the trigger 31, imparts a rotation to the dispensing housing 18 in a direction of movement of the trigger 31 as the trigger 31 is depressed. This rotation ceases when the axle 38 contacts the second end 62 of the axle slot 60, wherein the user may relax their one-handed grip of the cannister 12 and the trigger 31 and allow the trigger 31 to be biased to the default position which concurrently moves the dispensing housing 18 to a default position such as in FIG. 14, or as noted above.

In FIG. 15 is shown the device of FIGS. 13-14 with the dispensing housing 18 rotated from the default position of FIG. 14 to a dispensing position. In this position, the user depressing the trigger 31 while gripping the device 10 with one hand in the central portion 25 which defines the gripping area for a hand of a user, covered by the flexible sleeve 14, has caused rotation of the dispensing housing 18 to the dispensing position shown in FIG. 16.

FIGS. 17-19 depicts various exploded views of the trigger mechanism enabling the one-handed activation of the device 10 herein for rotation of the dispensing housing 18. As shown in the figures, the trigger 31 has the axle slot 60 which engages over and runs upon the axle 38 of the dispensing housing 18. During translation of the axle slot 60 along the axle 38, the secondary member 64 engaged with the dispensing housing 18 will slide within the second slot 66 and concurrently will impart rotation to the dispensing housing 18 toward the dispensing configuration of FIG. 15 from the default configuration of FIG. 14. Once the user, in the one-handed activation of the device 10 relaxes their grip, the spring 37 or biasing member will impart force to the trigger 31 which will translate it in a reverse direction and thereby impart force to the secondary member 64 engaged with the second slot 66 to rotate the dispensing housing 18 back to the default position of FIG. 14. The biasing force of the biasing member or spring 37, upon the trigger 31, is communicated to the dispensing housing 18 by the secondary member 64 engaged with the second slot 66 and holds the dispensing housing 18 in this default position.

As noted, any of the different configurations and components herein can be employed with any other configuration or component shown and described herein. Additionally, while the present invention has been described herein with reference to particular embodiments thereof and steps in the method of production, a latitude of modifications, various changes and substitutions are intended in the foregoing disclosures, it will be appreciated that in some instance some features, or configurations, or steps in formation of the invention could be employed without a corresponding use of other features without departing from the scope of the invention as set forth in the following claims. All such changes, alternations and modifications as would occur to those skilled in the art are considered to be within the scope of this invention as broadly defined in the appended claims.

Further, the purpose of any abstract of this specification is to enable the U.S. Patent and Trademark Office, the public generally, and especially the scientists, engineers, and practitioners in the art who are not familiar with patent or legal terms or phraseology, to determine quickly from a cursory inspection the nature and essence of the technical disclosure of the application. Any such abstract is neither intended to define the invention of the application, which is measured by the claims, nor is it intended to be limiting, as to the scope of the invention in any way.

What is claimed is:

1. A portable storage and dispensing apparatus, comprising:

a sidewall defining a cannister, said cannister having a first end and having a central portion adjacent a second end of said cannister;

said central portion of said cannister having a first side opposite a second side;

said central portion of said cannister defining a gripping area of said cannister adapted for a one-handed grip of one hand of a user with said first side of said central portion forming a contact area adapted for contact of a palm of said hand and said trigger adapted for actuation by contact of fingers of said hand of said user during said one-handed grip;

a flexible elastic sleeve engaged around an exterior of said central portion of said cannister defining said gripping area;
an interior cavity located at said first end of said cannister;
an outlet located at said second end of said cannister;
a dispensing housing rotationally positioned within said central portion of said cannister;
said dispensing housing having a measuring chamber therein;
said measuring chamber having an inlet aperture on one end thereof;
said measuring chamber having an exit opening on a second end, opposite said inlet aperture;
said dispensing housing having a first position wherein said inlet aperture is in a communication with said internal cavity;
said dispensing housing having a second position wherein said inlet aperture is blocked from said communication with said interior cavity;
said dispensing housing in said second position locating said exit opening in a communication with said outlet at said second end of said cannister;
a trigger for moving said dispensing housing from said first position to said second position;
said trigger biased to a projecting position extending from said second side of said central portion of said cannister, said trigger actuable to a depressed position;
a covering portion of said flexible elastic sleeve, said covering portion covering said trigger extending from said second side of said central portion of said cannister,
said covering portion forming a seal over said trigger and gaps between said trigger and said sidewall on said second side of said central portion of said cannister, said seal preventing moisture and pathogens from passing through said gaps; and
wherein a volume of powder from said interior cavity fills said measuring chamber with said dispensing housing in said first position, and said volume of powder is dispensed from said measuring chamber through said exit opening with said dispensing housing in said second position.

2. The portable storage and dispensing apparatus of claim 1, additionally comprising:
a plurality of depressions depending into said trigger; and
said covering portion formed with a plurality of covering depressions each matching a respective location of one of said plurality of depressions depending into said trigger.

3. A portable storage and dispensing apparatus, comprising:
a sidewall defining a cannister, said cannister having a first end and having a central portion adjacent a second end of said cannister;
said central portion of said cannister having a first side opposite a second side;
an interior cavity located at said first end of said cannister;
an outlet located at said second end of said cannister;
a dispensing housing rotationally positioned within said central portion of said cannister;
said dispensing housing having a measuring chamber therein;
said measuring chamber having an inlet aperture on one end thereof;
said measuring chamber having an exit opening on a second end, opposite said inlet aperture;
said dispensing housing having a first position wherein said inlet aperture is in a communication with said internal cavity;
said dispensing housing having a second position wherein said inlet aperture is blocked from said communication with said interior cavity;
said dispensing housing in said second position locating said exit opening in a communication with said outlet at said second end of said cannister;
a trigger for moving said dispensing housing from said first position to said second position;
said trigger biased to a projecting position extending from said second side of said central portion of said cannister, said trigger actuable to a depressed position;
said trigger having an axle slot therein extending between a first end and a second end;
an axle extending from said dispensing housing, said axle in a translating engagement within said axle slot;
said trigger having a second slot;
a second member extending from said dispensing housing slidably engaged in said second slot;
actuation of said trigger to said depressed position translating said axle slot along said axle and concurrently imparting a translation to said second member within said second slot whereby said translation of said second member rotates said dispensing housing;
said central portion of said cannister defining a gripping area of said cannister adapted for a one-handed grip of one hand of a user with said first side of said central portion forming a contact area adapted for contact of a palm of said hand and said trigger adapted for actuation by contact of fingers of said hand of said user during said one-handed grip; and
wherein a volume of powder from said interior cavity fills said measuring chamber with said dispensing housing in said first position, and said volume of powder is dispensed from said measuring chamber through said exit opening with said dispensing housing in said second position.

4. A portable storage and dispensing apparatus, comprising:
a sidewall defining a cannister, said cannister having a first end and having a central portion adjacent a second end of said cannister;
said central portion of said cannister having a first side opposite a second side;
said central portion of said cannister defining a gripping area of said cannister adapted for a one-handed grip of one hand of a user with said first side of said central portion forming a contact area adapted for contact of a palm of said hand and said trigger adapted for actuation by contact of fingers of said hand of said user during said one-handed grip;
a flexible elastic sleeve engaged around an exterior of said central portion of said cannister defining said gripping area; and
an interior cavity located at said first end of said cannister;
an outlet located at said second end of said cannister;
a dispensing housing rotationally positioned within said central portion of said cannister;
said dispensing housing having a measuring chamber therein;
said measuring chamber having an inlet aperture on one end thereof;
said measuring chamber having an exit opening on a second end, opposite said inlet aperture;

said dispensing housing having a first position wherein said inlet aperture is in a communication with said internal cavity;

said dispensing housing having a second position wherein said inlet aperture is blocked from said communication with said interior cavity;

said dispensing housing in said second position locating said exit opening in a communication with said outlet at said second end of said cannister;

a trigger for moving said dispensing housing from said first position to said second position;

said trigger biased to a projecting position extending from said second side of said central portion of said cannister, said trigger actuable to a depressed position;

said trigger having an axle slot therein extending between a first end and a second end;

an axle extending from said dispensing housing, said axle in a translating engagement within said axle slot;

said trigger having a second slot;

a second member extending from said dispensing housing slidably engaged in said second slot;

actuation of said trigger to said depressed position translating said axle slot along said axle and concurrently imparting a translation to said second member within said second slot whereby said translation of said second member rotates said dispensing housing; and wherein a volume of powder from said interior cavity fills said measuring chamber with said dispensing housing in said first position, and said volume of powder is dispensed from said measuring chamber through said exit opening with said dispensing housing in said second position.

5. A portable storage and dispensing apparatus, comprising:

a sidewall defining a cannister, said cannister having a first end and having a central portion adjacent a second end of said cannister;

said central portion of said cannister having a first side opposite a second side;

an interior cavity located at said first end of said cannister;

an outlet located at said second end of said cannister;

a dispensing housing rotationally positioned within said central portion of said cannister;

said dispensing housing having a measuring chamber therein;

said measuring chamber having an inlet aperture on one end thereof;

said measuring chamber having an exit opening on a second end, opposite said inlet aperture;

said dispensing housing having a first position wherein said inlet aperture is in a communication with said internal cavity;

said dispensing housing having a second position wherein said inlet aperture is blocked from said communication with said interior cavity;

said dispensing housing in said second position locating said exit opening in a communication with said outlet at said second end of said cannister;

a trigger for moving said dispensing housing from said first position to said second position;

said trigger biased to a projecting position extending from said second side of said central portion of said cannister, said trigger actuable to a depressed position;

a plurality of depressions depending into said trigger; said depressions being adapted for respective individual contacts with respective individual fingers of said hand of said user during a said one-handed grip of said cannister;

said trigger having an axle slot therein extending between a first end and a second end;

an axle extending from said dispensing housing, said axle in a translating engagement within said axle slot;

said trigger having a second slot;

a second member extending from said dispensing housing slidably engaged in said second slot;

actuation of said trigger to said depressed position translating said axle slot along said axle and concurrently imparting a translation to said second member within said second slot whereby said translation of said second member rotates said dispensing housing;

said central portion of said cannister defining a gripping area of said cannister adapted for a one-handed grip of one hand of a user with said first side of said central portion forming a contact area adapted for contact of a palm of said hand and said trigger adapted for actuation by contact of fingers of said hand of said user during said one-handed grip; and wherein a volume of powder from said interior cavity fills said measuring chamber with said dispensing housing in said first position, and said volume of powder is dispensed from said measuring chamber through said exit opening with said dispensing housing in said second position.

6. The portable storage and dispensing apparatus of claim 1 additionally comprising:

said trigger having an axle slot therein extending between a first end and a second end;

an axle extending from said dispensing housing, said axle in a translating engagement within said axle slot;

said trigger having a second slot;

a second member extending from said dispensing housing slidably engaged in said second slot; and actuation of said trigger to said depressed position translating said axle slot along said axle and concurrently imparting a translation to said second member within said second slot whereby said translation of said second member rotates said dispensing housing.

7. A portable storage and dispensing apparatus, comprising:

a sidewall defining a cannister, said cannister having a first end and having a central portion adjacent a second end of said cannister;

said central portion of said cannister having a first side opposite a second side;

said central portion of said cannister defining a gripping area of said cannister adapted for a one-handed grip of one hand of a user with said first side of said central portion forming a contact area adapted for contact of a palm of said hand and said trigger adapted for actuation by contact of fingers of said hand of said user during said one-handed grip;

a flexible elastic sleeve engaged around an exterior of said central portion of said cannister defining said gripping area; and an interior cavity located at said first end of said cannister;

an outlet located at said second end of said cannister;

a dispensing housing rotationally positioned within said central portion of said cannister;

said dispensing housing having a measuring chamber therein;

said measuring chamber having an inlet aperture on one end thereof;

said measuring chamber having an exit opening on a second end, opposite said inlet aperture;

said dispensing housing having a first position wherein said inlet aperture is in a communication with said internal cavity;

said dispensing housing having a second position wherein said inlet aperture is blocked from said communication with said interior cavity;

said dispensing housing in said second position locating said exit opening in a communication with said outlet at said second end of said cannister;

a trigger for moving said dispensing housing from said first position to said second position;

said trigger biased to a projecting position extending from said second side of said central portion of said cannister, said trigger actuable to a depressed position;

said trigger having an axle slot therein extending between a first end and a second end;

an axle extending from said dispensing housing, said axle in a translating engagement within said axle slot;

said trigger having a second slot;

a second member extending from said dispensing housing slidably engaged in said second slot;

actuation of said trigger to said depressed position translating said axle slot along said axle and concurrently imparting a translation to said second member within said second slot whereby said translation of said second member rotates said dispensing housing;

a plurality of depressions depending into said trigger, said depressions being adapted for respective individual contacts with respective individual fingers of said hand of said user during a said one-handed grip of said cannister; and wherein a volume of powder from said interior cavity fills said measuring chamber with said dispensing housing in said first position, and said volume of powder is dispensed from said measuring chamber through said exit opening with said dispensing housing in said second position.

8. The portable storage and dispensing apparatus of claim 2 additionally comprising:

said trigger having an axle slot therein extending between a first end and a second end;

an axle extending from said dispensing housing, said axle in a translating engagement within said axle slot;

said trigger having a second slot;

a second member extending from said dispensing housing slidably engaged in said second slot; and actuation of said trigger to said depressed position translating said axle slot along said axle and concurrently imparting a translation to said second member within said second slot whereby said translation of said second member rotates said dispensing housing.

9. The portable storage and dispensing apparatus of claim 1, wherein said outlet is located in a second end of a dispensing tip;

a first end of said dispensing tip opposite said second end, configured for a removable engagement to said second end of said cannister; and said dispensing tip being frustoconical in shape and having a larger cross section at said first end which narrows to a smaller cross section at said second end.

10. The portable storage and dispensing apparatus of claim 2, wherein said outlet is located in a second end of a dispensing tip;

a first end of said dispensing tip opposite said second end, configured for a removable engagement to said second end of said cannister; and said dispensing tip being frustoconical in shape and having a larger cross section at said first end which narrows to a smaller cross section at said second end.

* * * * *